March 1, 1949.  R. C. DUSTIN  2,463,364
PUMPING APPARATUS
Filed July 7, 1943
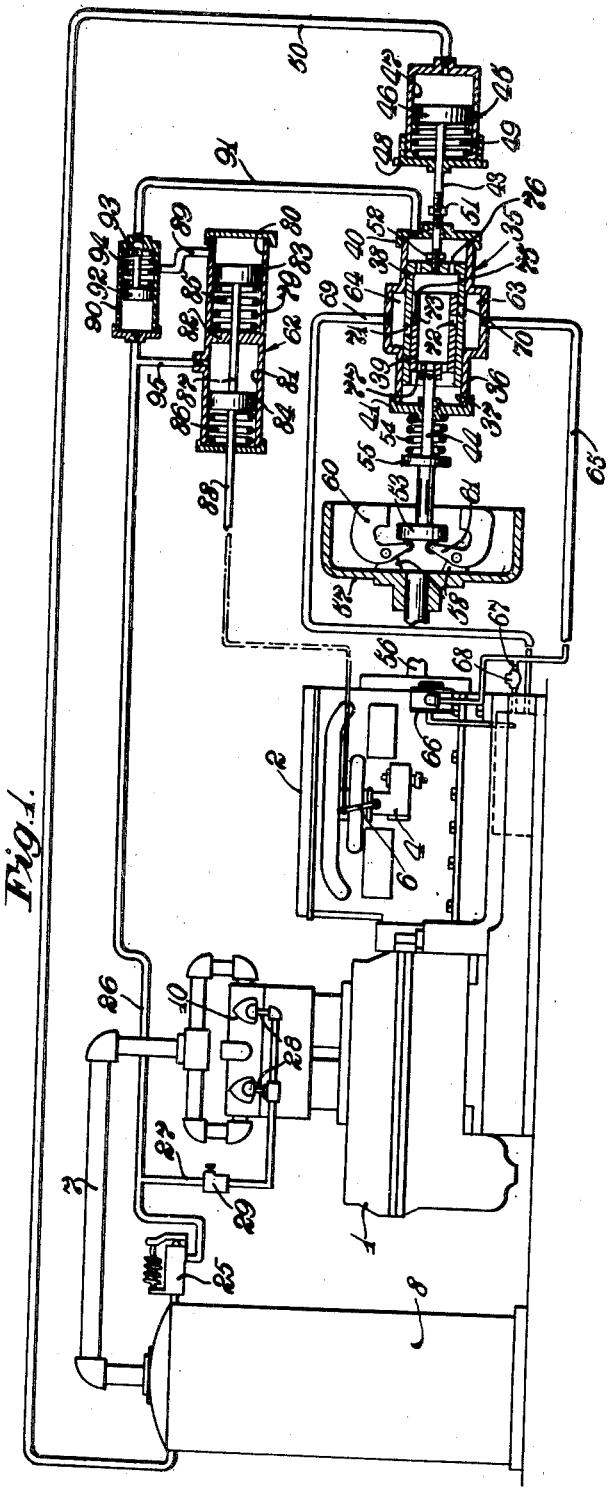
Inventor:
Ralph C. Dustin
by
Anni A. Maxom.
Att'y.

Patented Mar. 1, 1949

2,463,364

UNITED STATES PATENT OFFICE 2,463,364

PUMPING APPARATUS

Ralph C. Dustin, Claremont, N. H., assignor to Joy Manufacturing Company, a corporation of Pennsylvania Application July 7, 1943, Serial No. 493,745

16 Claims. (Cl. 230—5)

My invention relates to mechanisms for governing the operation of pumps, and more particularly to mechanisms for regulating the speed of driving engines for compressors.

It is desirable that a speed control mechanism be provided for regulating gradually the speed of a pump or a compressor in accordance with its discharge pressure. Such mechanism should also operate, in the event of a reduction in the engine load which may result from a break in the compressor discharge line or in the driving connections, to reduce the supply of operating fluid to the compressor driving engine so as to prevent the latter from operating at excessive speeds. At a predetermined maximum discharge pressure the compressor should be unloaded and the engine should be reduced to an idling speed, and the driving of the compressor unloaded at an idling speed should continue until a predetermined lower discharge pressure is reached.

The above speed regulation may be obtained with my improved control mechanism wherein, in a preferred embodiment, a pair of valve members, one responsive to the compressor discharge pressure and the other responsive to the speed of the engine, operate to control the flow of fluid relative to a fluid actuated device which controls the flow of operating fluid to the engine. Any increase in discharge pressure or engine speed causes changes in the relative positions of the valve members effecting supply of fluid to the fluid actuated device, and a decrease in discharge pressure or engine speed causes changes in the relative positions of the valve members resulting in venting of fluid from the fluid actuated device. At the maximum desired discharge pressure, the flow of fluid between the valve members and the fluid actuated device is cut off, the supply of operating fluid to the engine is reduced to effect an operation of the latter at an idling speed, and the compressor is unloaded. Adjustable means are provided for limiting the reduction in speed of the compressor, by movement of the valve members, to any desired value. For instance, an adjustment may be made whereby the speed of the compressor may be gradually reduced with increasing discharge pressure until the maximum desired pressure is reached, or other adjustments may be made to effect a gradual reduction in speed to a predetermined value after which the speed remains constant until the desired maximum discharge pressure is reached. When the compressor is reloaded, the speed of the engine is that which is determined by the positions of the valve members, and the positions of the valve members vary with the pressure at which reloading takes place. A decrease in discharge pressure when the compressor operates loaded results in an increase in engine speed until a maximum desired speed is reached.

An object of this invention is to provide an improved speed control mechanism for a pump or compressor. Another object is to provide an improved control mechanism for regulating gradually the speed of a compressor in accordance with compressor discharge pressures. Still another object is to provide improved control mechanism responsive to both the compressor discharge pressure and the speed of the compressor for regulating gradually the supply of operating fluid to the driving engine for the compressor. Yet another object is to provide an improved control mechanism for reducing gradually the speed of a compressor as its discharge pressure increases and, at a predetermined maximum discharge pressure, effecting an unloading of the compressor and a slowing down of its driving engine to an idling speed. Other objects of the invention will hereinafter more fully appear.

In the accompanying drawing there is shown one form which the invention may assume in practice.

In this drawing:

Fig. 1 is a schematic diagram showing a compressor having my improved speed control mechanism associated therewith.

Fig. 2 is an enlarged sectional view of the compressor unloading mechanism.

There is shown in the drawing a compressor 1 connected in driven relation with a power unit 2. This power unit may be of any suitable type but is shown herein as an internal combustion engine having a conduit 4 for supplying operating fluid to its combustion chambers. Arranged within the conduit 4 is a throttle valve, not shown, for controlling the flow of operating fluid, and connected to the throttle valve is an arm 6 which may be swung in a counter-clockwise direction, as viewed in Fig. 1, for reducing the flow of fluid to the engine.

The compressor shown herein is of the two cylinder single stage type, but it will be understood that my invention is equally applicable to any of the general types of compressors. The fluid is discharged from the compressor through a suitable pipe connection 7 into a receiver 8 from which it may be supplied to any point of use.

Associated with each of the compressor cylinders is a fluid actuated unloading mechanism, generally designated 10. This unloading mechanism comprises, as shown in Fig. 2, a piston 11 reciprocably mounted in a bore 12 formed in a plate member 14 attached to the side of the cylinder head 15, as by bolts 16. A piston rod 18 is fixed to the piston and carries at its inner end a forklike member 19 adapted to engage the inlet valve 20 and hold the latter from its seat 21. Surrounding the piston rod is a coiled spring 23 acting between the member 14 at the inner end of the bore 12 and the piston 11 for holding the forklike member 19 normally in a position out of engagement with the inlet valve. Pressure fluid for operating the unloading mechanisms is supplied from the receiver under the control of a pilot valve 25 to a conduit 26 which is connected by a branch conduit 27 and conduits 28 in communication with the outer ends of the bores 12. Connected in the conduit 27 is a standard flow control device 29 which permits a free flow of fluid toward the unloading mechanisms but restricts the flow of fluid in the opposite direction. The pilot valve 25 operates at a predetermined maximum receiver pressure to connect the conduit 26 in communication with the receiver, and operates again at a predetermined minimum receiver pressure to connect the conduit 26 to atmosphere. When the conduit 26 is vented to atmosphere, any pressure fluid in the bores 12 of the unloading devices is vented slowly through the device 29, and the forklike member 19 is moved, after a short time, out of engagement with the inlet valve so that the latter operates normally to control the flow of fluid to the cylinder bore where it is compressed and then discharged past a discharge valve 31 to a passage 32 communicating with the conduit 7. When pressure fluid is supplied from the receiver to the conduit 26, the fluid flows freely through the conduit 27 past the control device 29 and is delivered through the conduits 28 to the bores 12 where it forces the pistons 11 inwardly and unseats the inlet valves 20 for unloading the compressor.

Arranged at one end of the power unit 2 is my improved speed control mechanism, generally designated 35. This speed control mechanism includes a valve casing 36 having a bore 37 which contains a pair of concentric sleeve shaped valve members 38 and 39. Fixed to the ends of the valve casing are cover plates 40 and 41 for closing the ends of the bore 37, and extending through the cover plates 40 and 41 are rods 43 and 44 connected, respectively, to the valve members 38 and 39. The outer end of the rod 43 extends into a cylinder 45 and has fixed to it a piston 46 which is reciprocably mounted in a bore 47 in the cylinder. Arranged between a cover plate 48 at one end of the cylinder and the piston 46 is a spring 49 for urging the valve member 38 towards the right, as viewed in Fig. 1. Pressure fluid is supplied from the receiver through a conduit 50 to the cylinder bore 47 where it acts on the piston 46 and moves the latter against the force of the spring 49 for positioning the valve member 38. Threaded on the rod 43 are nuts 51 and 52 which are engageable with the cover plate 40 for limiting movements of the valve member 38. The rod 44 has an enlargement 53 formed on its outer end, and a spring 54 acts between the outer side of the cover plate 41 and another enlargement 55 on the rod for urging the valve member 39 toward the left in Fig. 1. Fixed to an extension of the engine drive shaft 56 is a housing 57 having projecting portions 58 spaced from the axis of the drive shaft. Pivotally connected to the portions 58 are weighted arms 60 having inwardly projecting portions 61 engaging the enlargement 53 on the rod 44 for determining the positions of the valve member 39.

The valve members 38 and 39 are adapted to control the flow of fluid relative to a fluid actuated device, generally designated 62, for determining the position of the engine throttle valve. Formed in opposite sides of the valve casing 36 are recesses 63 and 64 opening into the bore 37. Communicating with the recess 63 is a conduit 65 through which a fluid, in this case oil, is supplied under pressure from the engine crankcase by a pump 66. A conduit 67 having a spring loaded by-pass valve 68 therein connects the conduit 65 in communication with the engine crankcase so as to limit the pressures built up in conduit 65. The recess 64 is connected by a vent pipe 69 to the engine crankcase. Opening through the valve member 38 into the recesses 63 and 64 at points spaced from each other longitudinally along the axis of the valve member, are ports 70 and 71. Extending through the valve member 39 at opposite sides of the latter are ports 72 and 73 having their centers lying in the same transverse plane. The longitudinal spacing of the ports 70 and 71 is such that they may be positioned at opposite sides of the ports 72 and 73 with the valve member 38 barely covering the latter ports, as shown in Fig. 1. The valve member 39 has a groove 75 cut in its outer surface between the port 73 and its right-hand end so that the port 71 may communicate with the interior of the valve casing whenever this port is moved to the right of port 73. Oil supplied to the space within the valve member 39 is conducted through openings 76 and 77 in the ends of the valve members 38 and 39 to the spaces at the opposite ends of the bore 37 where it acts to balance the pressures on the valve members.

The fluid actuated device 62 comprises a casing 79 having alined bores 80 and 81 separated by a partition 82. Arranged within the bores 80 and 81 are pistons 83 and 84 which are urged toward the right in Fig. 1 by springs 85 and 86. The piston 83 is provided with a rod 87 extending through the partition 82 and adapted to engage the piston 84. The piston 84 is connected by a rod 88 to the arm 6 of the engine throttle valve. The right-hand end of the bore 80 is connected by a conduit 89 to a valve casing 90 which is connected in communication with the interior of the valve casing 36 by a conduit 91. A piston 92 is reciprocable within the casing 90 and carries a valve member 93 which is adapted to cut off communication between the interior of the casing and the conduit 91. A spring 94 acts against the piston 92 to hold the valve member 93 normally unseated. The conduit 26 opens into the end of the valve casing 90 opposite from the connection of the latter to the conduit 91, and a conduit 95 connects the conduit 26 in communication with the bore 81 at the right-hand side of the piston 84.

The operation of the mechanism described is as follows. The speed control mechanism is shown with its valve members 38 and 39 in the positions taken by them when the compressor delivers fluid to the receiver at a discharge pressure somewhat below that at which unloading takes place—a pressure perhaps in the range of 90 pounds per square inch where unloading takes place at 100 pounds per square inch. As the pressure in the receiver increases, the piston 46 is moved to the left until the port 70 communicates with the port 72. Oil delivered by the pump 66 through the conduit 65 to the recess 63 then flows through the ports 70, 72 to the interior of the valve members where it passes through the openings 76 and 77 to the ends of the valve casing 36. The oil is conducted from the casing through the conduit 91, the valve casing 90 and the conduit 89 to the bore 80 where it acts to force the piston 83 to the left. Since the piston rod 87 engages the piston 84 at this time, the latter piston will also be forced to the left and effect a closing movement of the engine throttle valve. The supply of operating fluid to the engine will be reduced until the engine slows down to such an extent that the valve member 39 moves to a position cutting off communication through ports 70 and 72. As the receiver pressure continues to increase, the valves move to new positions with a gradual decrease in engine speed until the nut 51 on the rod 43 engages the end of the valve casing. The speed of the engine then remains constant until the receiver pressure builds up to the value at which the pilot valve 25 opens and supplies fluid to the conduit 26. If desired, the nut 51 may be adjusted on the rod 43 to a position permitting movement of the valve member 38 to effect a gradual slowing of the compressor up to the time the pilot valve opens. Pressure fluid flows, when the pilot valve 25 opens, through the conduit 26 to the valve casing 90 where it acts on the piston 92 to close the valve 93. It also flows from the conduit 26 through the conduit 27 to the compression unloading devices, and through conduit 95 to the bore 81 where it forces the piston 84 to the left for slowing the engine down to an idling speed.

With the slowing down of the engine, the weighted arms 60 move inwardly and permit the valve member 39 to move to the left end of the casing 36 where it remains as long as the pilot valve stays open and causes the engine to operate at an idling speed. The valve port 71 will then communicate with the port 73 or the groove 75 but no fluid will be vented to the conduit 69 from the fluid actuated device 62 because the valve 93 is seated.

The receiver pressure may then decrease to the value at which the pilot valve moves to its venting position and, as it does so, the valve 38 either moves to the right or remains stationary, depending on the pressure at which reloading takes place and the adjustment of the nut 51. If the nut 51 is adjusted to stop the movement of the valve 38 to the left when the receiver pressure is the same as or less than the pressure at which reloading takes place, then the valve 38 will remain stationary during a drop from unloading pressure to the pressure at which the compressor is reloaded. If the valve 38 is permitted to move to the left up to the time the compressor is unloaded, then it will move to the right as the pressure drops to the value at which the compressor reloads. When the receiver pressure drops to the value at which the pilot valve vents the conduit 26, fluid escapes from the casing 90 permitting the valve 93 to open. It also escapes from the bore 81 permitting the piston 84 to move to the right until it engages the rod 87. The compressor unloading devices are also vented through the conduit 27 but the delay device 29 prevents an immediate reloading of the compressor.

With the bores 80 and 81 vented, the pistons 83 and 84 are moved to the right by the springs 85 and 86. The movement of the piston 83 to the right forces oil from the bore 80 through the conduit 89 and past the valve 93 to the conduit 91 through which it passes to the casing 36 where it escapes through ports 73, 71 to the vent conduit 69. If desired, suitable means may be provided for restricting the escape of oil from the bore 80 so as to retard the movement of the pistons 83 and 84. As the piston 84 moves to the right, the throttle valve is opened and the speed of the engine is increased until the weighted arms 60 swing outwardly and move the valve member 39 to a position with its port 73 to the right of port 71. The escape of oil from the bore 80 is then cut off preventing further movement of the pistons 83 and 84 to the right, and the engine operates at the speed corresponding to the position of the piston 84 until the pressure in the receiver changes and effects a movement of the valve 38. If the speed of the engine increases too rapidly and moves the valve 39 to a point connecting the port 72 in communication with the port 70, then oil will be supplied to the bore 80 for moving the pistons 83 and 84 in a direction to slow down the engine. If the receiver pressure drops, the valve member 38 moves to the right connecting port 71 in communication with port 73 so as to speed up the engine still more. The adjustment of nut 52 on the rod 43 determines the distance that the valve member 38 may move to the right and the maximum speed of the engine.

As a result of this invention there is provided an improved speed control mechanism for a pump or a compressor. It will be noted that this mechanism may be adjusted to vary the speed of the pump or compressor gradually with changes in discharge pressure until a maximum or a minimum desired pumping speed is reached. In the event of a decrease in the engine load, the supply of operating fluid to the engine is reduced so that its speed does not increase materially above that at which it was operating before the load reduction. With the control there is obtained an extremely efficient system which is capable of a wide range of adjustments. Other advantages of my control mechanism will be clearly apparent to those skilled in the art.

While there is in this application specifically described one form which my invention may assume in practice, it will be understood that this form is shown for purposes of illustration and that the invention may be embodied in various other forms without departing from its spirit or the scope of the appended claims.

What I claim as new and desire to secure by Letters Patent is:

1. In a pumping apparatus, in combination, a power unit, a pump connected in driven relation with said power unit, means for controlling the supply of operating fluid to said power unit, fluid actuated means for regulating said controlling means, supply and exhaust means for an actuating fluid, and means including a pair of valve members co-operating with each other, one responsive to the discharge pressure of said pump and the other responsive to the speed of said power unit, for controlling the connection of said fluid actuated means to said supply and exhaust means.

2. In a pumping apparatus, in combination, a power unit, a pump connected in driven relation with said power unit, means for controlling the supply of operating fluid to said power unit, fluid actuated means for regulating said controlling means, supply and exhaust means for an actuating fluid, and means including a pair of concentric valve members, one responsive to the discharge pressure of said pump and the other responsive to the speed of said power unit, for controlling the connection of said fluid actuated means to said supply and exhaust means, each of said valve members having a plurality of ports, the ports in one valve member adapted to communicate with the ports in the other when said valve members are in predetermined positions relative to each other.

3. In a pumping apparatus, in combination, a power unit, a pump connected in driven relation with said power unit, means for controlling the supply of operating fluid to said power unit, fluid actuated means for regulating said controlling means, supply and exhaust means for an actuating fluid, and means including a pair of concentric valve members movable relative to each other, one responsive to the discharge pressure of said pump and the other responsive to the speed of said power unit, for controlling the connection of said fluid actuated means to said supply and exhaust means, each of said valve members having a fluid supply port and a fluid exhaust port, said valve members movable to positions for cutting off fluid flow through said ports, said fluid supply ports adapted to communicate with each other on relative movement between said valve members in one direction from such positions and said fluid exhaust ports adapted to communicate with each other on relative movement between said valve members in the opposite direction from such positions.

4. In a pumping apparatus, in combination, a power unit, a pump connected in driven relation with said power unit, means for controlling the supply of operating fluid to said power unit, fluid actuated means for regulating said controlling means, supply and exhaust means for an actuating fluid, means including a pair of concentric valve members, one responsive to the discharge pressure of said pump and the other responsive to the speed of said power unit, for controlling the connection of said fluid actuated means to said supply and exhaust means, said valve members movable bodily relative to each other, and adjustable means for limiting the bodily movement of one of said valve members.

5. In a pumping apparatus, in combination, a power unit, a pump connected in driven relation with said power unit, means for controlling the supply of operating fluid to said power unit, fluid actuated means for regulating said controlling means, supply and exhaust means for an actuating fluid, means including a pair of concentric sleeve-shaped valve members, one responsive to the discharge pressure of said pump and the other responsive to the speed of said power unit, for controlling the connection of said fluid actuated means to said supply and exhaust means, said valve members movable longitudinally relative to each other, and adjustable means for limiting the movement of said valve member responsive to pump discharge pressure.

6. In a pumping apparatus, in combination, a power unit, a pump connected in driven relation with said power unit, means for controlling the supply of operating fluid to said power unit, fluid actuated means for regulating said controlling means, supply and exhaust means for an actuating fluid, means including a pair of concentric sleeve-shaped valve members, one responsive to the discharge pressure of said pump and the other responsive to the speed of said power unit, for controlling the connection of said fluid actuated means to said supply and exhaust means, said valve members movable longitudinally relative to each other, each of said valve members having a fluid supply port and a fluid exhaust port, said fluid supply ports adapted to communicate with each other on relative movement between said valve members in one direction and said fluid exhaust ports adapted to communicate with each other on relative movement between said valve members in the opposite direction, and adjustable means for limiting the movement of said valve member responsive to pump discharge pressure.

7. In a pumping apparatus, in combination, a power unit, a pump connected in driven relation with said power unit, fluid actuated unloading means for said pump, means for controlling the supply of operating fluid to said power unit, fluid actuated means for regulating said controlling means, fluid supply and exhaust means, means including a pair of valve members, one responsive to the discharge pressure of said pump and the other responsive to the speed of said power unit, for controlling the connection of said regulating means to said fluid supply and exhaust means, and means responsive to pump discharge pressure for controlling the flow of fluid relative to said unloading means and to said regulating means.

8. In a pumping apparatus, in combination, a power unit, a pump connected in driven relation with said power unit, fluid actuated unloading means for said pump, means for controlling the supply of operating fluid to said power unit, fluid actuated means for regulating said controlling means, fluid supply and exhaust means, means including a pair of valve members, one responsive to the discharge pressure of said pump and the other responsive to the speed of said power unit, for controlling the connection of said regulating means to said fluid supply and exhaust means, fluid actuated valve means for controlling the flow of fluid between said valve members and said regulating means, and means responsive to pump discharge pressure for controlling the flow of fluid relative to said unloading means, said regulating means and said valve means.

9. In a pumping apparatus, in combination, a power unit, a pump connected in driven relation with said power unit, unloading means for said pump, means for controlling the supply of operating fluid to said power unit, fluid actuated means for regulating said controlling means, fluid supply and exhaust means, means including a pair of valve members, one responsive to the discharge pressure of said pump and the other responsive to the speed of said power unit, for controlling the connection of said regulating means to said fluid supply and exhaust means, and means operative at a predetermined maximum pump discharge pressure for effecting an unloading operation of said unloading means and an actuation of said controlling means to reduce the speed of said power unit.

10. In a compressor system, in combination, an internal combustion engine, a compressor connected in driven relation with said engine, a throttle valve for controlling the supply of operating fluid to said engine, liquid actuated means for regulating said throttle valve, supply and exhaust means for said liquid actuated means, means including a pair of valve members, one responsive to the discharge pressure of said compressor and the other responsive to the speed of said engine, for controlling the connection of said regulating means to said supply and exhaust means.

11. In a compressor system, in combination, an internal combustion engine, a compressor connected in driven relation with said engine, unloading means for said compressor, a throttle valve for controlling the supply of operating fluid to said engine, liquid actuated means for regulating said throttle valve, supply and exhaust means for said liquid actuated means, means including a pair of concentric sleeve-shaped valve members, one responsive to the discharge pressure of said compressor and the other responsive to the speed of said engine, for controlling the connection of said regulating means to said supply and exhaust means, and means operative at a predetermined maximum pump discharge pressure for effecting an unloading operation of said unloading means and an actuation of said throttle valve to reduce the supply of operating fluid to said engine.

12. In a compressor system, in combination, an internal combustion engine, a compressor connected in driven relation with said engine, a throttle valve for controlling the supply of operating fluid to said engine, hydraulic means operative on the supply of liquid under pressure thereto for regulating said throttle valve to effect a slowing down of said engine, supply and exhaust means for said hydraulic means, and means including a pair of concentric valve members, one responsive to the discharge pressure of said compressor and the other responsive to the speed of said engine, for controlling the connection of said hydraulic means to said supply and exhaust means, said valve members operative on increase in discharge pressure or engine speed for connecting said hydraulic means to said supply means.

13. In a pumping apparatus, in combination, a power unit, a pump connected in driven relation with said power unit, a throttle valve for controlling the supply of operating fluid to said power unit, fluid actuated means for regulating said throttle valve, and means for controlling the flow of fluid relative to said fluid actuated means, said last mentioned means including means providing a bore, concentric sleeve-shaped valve members, one reciprocable in the other and the larger reciprocable in said bore, means responsive to the speed of said power unit for controlling one of said valve members, means responsive to pump discharge pressure for controlling the other of said valve members, recesses in the side walls of said bore, means for supplying fluid under pressure to one of said recesses, means for exhausting fluid from another of said recesses, ports in said valve members for connecting said recesses selectively in communication with said bore, and means for connecting said fluid actuated means in communication with said bore.

14. In a pumping apparatus, in combination, a power unit, a pump connected in driven relation with said power unit, a throttle valve for controlling the supply of operating fluid to said power unit, fluid actuated means for regulating said throttle valve, and means for controlling the flow of fluid relative to said fluid actuated means, said last mentioned means including means providing a bore, concentric sleeve-shaped valve members, one reciprocable in the other and the larger reciprocable in said bore, means responsive to the speed of said power unit for controlling one of said valve members, means responsive to pump discharge pressure for controlling the other of said valve members, recesses in the side walls of said bore, means for supplying fluid under pressure to one of said recesses, means for exhausting fluid from another of said recesses, ports opening through said valve members for connecting the one of said recesses to which fluid is supplied in communication with said bore when said valve members are in predetermined relative positions, ports opening through said valve members for connecting the one of said recesses from which fluid is exhausted in communication with said bore when said valve members are in different predetermined relative positions, and means for connecting said fluid actuated means in communication with said bore.

15. In a pumping apparatus, in combination, a power unit, a pump connected in driven relation with said power unit, a throttle valve for controlling the supply of operating fluid to said power unit, fluid actuated means for regulating said throttle valve, and means for controlling the flow of fluid relative to said fluid actuated means, said last mentioned means including means providing a bore, concentric sleeve-shaped valve members one smaller than and reciprocable in the other and the larger reciprocable in said bore, means responsive to the speed of said power unit for reciprocating one of said valve members, means responsive to pump discharge pressure for reciprocating the other of said valve members, recesses in the side walls of said bore, means for supplying fluid under pressure to one of said recesses, means for exhausting fluid from another of said recesses, ports opening through said valve members for connecting the one of said recesses to which fluid is supplied in communication with said bore when said valve members are moved relative to each other by reason of increasing pump discharge pressure or increasing speed of said power unit, ports opening through said valve members for connecting the one of said recesses from which fluid is exhausted in communication with said bore when said valve members are moved relative to each other by reason of decreasing pump discharge pressure or decreasing speed of said power unit, and means for connecting said fluid actuated means in communication with said bore.

16. In a compressor system, in combination, a power unit, a compressor connected in driven relation with said power unit, unloading means for said compressor, a throttle valve for controlling the supply of operating fluid to said power unit, fluid actuated means operative on the supply of fluid thereto for effecting a closing movement of said throttle valve, means for controlling the flow of fluid relative to said fluid actuated means, said last mentioned means including means providing a valve chamber, fluid supply and exhaust means for said chamber, valve members, one responsive to the discharge pressure of said compressor and another responsive to the speed of said power unit, for connecting said supply and exhaust means selectively in communication with said chamber, means for connecting said fluid actuated means in communication with said valve chamber, and means operative at a predetermined maximum compressor discharge pressure for effecting an unloading operation of said unloading means and an actuation of said throttle valve for slowing down said power unit.

RALPH C. DUSTIN.

REFERENCES CITED

The following references are of record in the file of this patent:

UNITED STATES PATENTS

| Number | Name | Date |
| --- | --- | --- |
| 1,550,876 | Carpenter | Aug. 25, 1925 |
| 2,171,286 | Baker | Aug. 29, 1939 |
| 2,212,631 | Baker | Aug. 27, 1940 |

Certificate of Correction

Patent No. 2,463,364                                                 March 1, 1949

RALPH C. DUSTIN

It is hereby certified that error appears in the printed specification of the above numbered patent requiring correction as follows:

Column 5, line 27, for the word "compression" read *compressor*;

and that the said Letters Patent should be read with this correction therein that the same may conform to the record of the case in the Patent Office.

Signed and sealed this 13th day of December, A. D. 1949.

[SEAL]

THOMAS F. MURPHY,
*Assistant Commissioner of Patents.*